United States Patent [19]
Kang

[11] Patent Number: 5,969,494
[45] Date of Patent: Oct. 19, 1999

[54] METHOD OF ESTIMATING GAIN OF SERVO CONTROL SYSTEM

[75] Inventor: Chang-Ik Kang, Seoul, Rep. of Korea

[73] Assignee: SamSung Electronics Co., Ltd., Suwon, Rep. of Korea

[21] Appl. No.: 08/934,516

[22] Filed: Sep. 22, 1997

[30] Foreign Application Priority Data

Sep. 25, 1996 [KR] Rep. of Korea ............... 96-42652

[51] Int. Cl.[6] ............................................. H02P 3/00
[52] U.S. Cl. ..................... 318/610; 318/609; 318/560; 318/611
[58] Field of Search ................... 318/560–696; 360/72–79; 364/140–169

[56] References Cited

U.S. PATENT DOCUMENTS

| | | |
|---|---|---|
| 4,697,127 | 9/1987 | Stich et al. . |
| 4,882,526 | 11/1989 | Iino et al. . |
| 4,965,501 | 10/1990 | Hashimoto . |
| 4,979,055 | 12/1990 | Squires et al. ........................ 360/69 |
| 4,983,898 | 1/1991 | Kanda . |
| 5,155,422 | 10/1992 | Sidman et al. ........................ 318/560 |
| 5,347,447 | 9/1994 | Kiji et al. . |
| 5,404,255 | 4/1995 | Kobayashi et al. . |
| 5,444,583 | 8/1995 | Ehrlich et al. ........................ 360/78.09 |
| 5,483,439 | 1/1996 | Ono et al. . |
| 5,495,156 | 2/1996 | Wilson et al. ........................ 318/368 |
| 5,521,771 | 5/1996 | Keithley et al. . |
| 5,576,909 | 11/1996 | Dierkes et al. . |
| 5,585,976 | 12/1996 | Pham . |
| 5,610,487 | 3/1997 | Hutsell . |
| 5,724,337 | 3/1998 | Kawano et al. ........................ 369/244 |
| 5,768,228 | 6/1998 | Bates et al. ........................ 369/44.28 |
| 5,774,291 | 6/1998 | Contreras et al. ........................ 360/67 |
| 5,781,362 | 7/1998 | Bang ........................ 360/78.05 |

*Primary Examiner*—Paul Ip
*Attorney, Agent, or Firm*—Robert E. Burshnell, Esq.

[57] ABSTRACT

A method of estimating the gain of a servo control system including an actuator, in which input data supplied to the actuator and the actuator's position data are applied to a gain estimate formula in a closed loop discrete value system for controlling the actuator, so as to estimate the gain of the servo control system.

10 Claims, 3 Drawing Sheets

METHOD OF ESTIMATING GAIN OF SERVO CONTROL SYSTEM

CLAIM OF PRIORITY

This application makes reference to, incorporates the same herein, and claims all benefits accruing under 35 U.S.C. §119 from an application for METHOD OF ESTIMATING GAIN OF SERVO CONTROL SYSTEM earlier filed in the Korean Industrial Property Office on the 25th of September 1996 and there duly assigned Ser. No. 42652/1996.

BACKGROUND OF THE INVENTION

1. Field of the Invention

The present invention relates to a servo control system of a disk drive using a disk as a recording medium and, more particularly, to a method of estimating the gain of a servo control system for controlling the position of a head which reads or writes data on a disk.

2. Description of the Related Art

Disk drives using a disk as a recording medium have been widely used as an auxiliary recording device of a computer system. A hard disk drive is a typical disk drive. The hard disk drive records data transmitted from a host computer on a predetermined track of the disk, and then reproduces and outputs the recorded data when a user demands it. That is, the main function of the hard disk drive is to read or write data.

In order to record data transmitted from the host computer on a predetermined track or to reproduce the recorded data from the track, first of all, the head must be located on the track. For this, a servo control is used for controlling the position and speed of the head. That is, the disk drive must include an element for carrying out reading and writing of data, and a servo controller for controlling the head before the reading and writing of data.

In a disk drive, a microprocessor is connected to a programmable read only memory and a static random access memory. A head is connected to one end of an actuator and effects a lateral movement on a disk of a recording medium and reads and writes data on the disk. A voice coil motor located on the other end of the actuator is vertically driven on the disk in response to the level and direction of the current supplied thereto. A spindle motor rotates the disk mounted on a driving axis in response to a control signal supplied from a motor driver. A voice coil motor driver connected to the voice coil motor controls the voice coil motor. A digital-to-analog converter which is connected to the microprocessor and the voice coil motor driver receives a digital control input signal from the microprocessor, converts it to an analog signal, and outputs it to the voice coil motor driver. The motor driver is connected to the spindle motor and microprocessor and controls the spindle motor under the control of the microprocessor.

A preamplifier connected to the head amplifies a read signal and outputs an input signal to be written by the head. A read/write channel circuit is connected to the microprocessor, preamplifier, and interface controller, and receives and encodes the written data from the interface controller and outputs it to the preamplifier under the control of the microprocessor. The read/write channel circuit digitally converts an analog read signal input from the preamplifier and outputs it as an encoded read data. An analog-to-digital converter is connected to the read/write channel circuit and receives an analog servo read signal and digitally converts it to a position error signal and outputs it to the microprocessor. A gate array connected to the read/write channel circuit receives the encoded read data and detects servo information such as a gray code in the servo region of the disk from the encoded read data.

In the aforementioned disk drive, the analog-to-digital converter, digital-to-analog converter, voice coil motor driver, and voice coil motor form one servo control system. Each element of the servo control system has a typical gain characteristic and accordingly, calibration during the servo control is obtained by measuring these characteristics when the drive is initially driven. That is, there are differences in the torque and inertia of the actuators between the disk drive sets and they can be changed by the surrounding temperature in the track seek mode of the disk drive. Furthermore, the gain of the digital-to-analog converter and analog-to-digital converter may be different between sets and changed by circumstances. Accordingly, a gain constant of the whole servo control system including the torque constant and inertia of the actuator, the gain constant of the digital-to-analog converter and the gain constant of the analog-to-digital converter are different between disk drive sets and can be variously changed according to environmental factors. In order to obtain the control performance of the servo control system which can overcome the environmental factors, the gain of the whole servo control system must be estimated all the time and automatically controlled. Accordingly, it is important to develop an algorithm for estimating the gain of the servo control system.

The transfer function of a servo control system is related to the torque constant of the voice coil motor, the inertia of the actuator, the gain constant of the digital-to-analog and analog-to-digital converters, and the sampling time. The microprocessor supplies a DC torque to an actuator to measure the speed during sampling and performs the estimation calculation employing control input data and output data as inputs to thereby output the gain estimate of the servo control system.

When a track is sought, since the DC torque is supplied during the acceleration section, the gain of the servo control system can be estimated at every track seek and thus, the control performance which can overcome the environmental variations can be obtained.

However, in the control system of the earlier disk drive, its speed is measured by differentiating the position data in order to obtain the output information of plant and this deteriorates the gain estimating performance of the servo control system if there is speed measurement noise. Furthermore, since the settling time of a power amplifier serving as a current controller is not considered in the earlier servo control system, the gain estimating performance of the servo control system is deteriorated.

The following patents each disclose features in common with the present invention but do not teach or suggest the specifically recited method of estimating the gain of a servo control system for controlling the position of a head which reads or writes data on a disk in accordance with the present invention: U.S. Pat. No. 5,483,439 to Ono et al., entitled Digital Servo Control System, U.S. Pat. No. 5,610,487 to Hutsell, entitled Servo System With Once Per Revolution Rejection, U.S. Pat. No. 5,347,447 to Kiji et al., entitled Adaptive Control System And Method Thereof U.S. Pat. No. 5,155,422 to Sidman et al., entitled Self-Tuning Adaptive Bandwidth Regulator, U.S. Pat. No. 4,983,898 to Kanda, entitled Method And System For Changing Control Parameters In Accordance With State Of Process In Process Control, U.S. Pat. No. 4,965,501 to Hashimoto, entitled servo Circuit, U.S. Pat. No. 4,882,526 to Iino et al, entitled Adaptive Process Control System, U.S. Pat. No. 4,697,127 to Stich et al., entitled Adaptive Control Technique For A Dynamic System, U.S. Pat. No. 5,576,909 to Dierkes et al., entitled Method For Positioning A Data Transducer Head In A Rotating Disk Drive Data Storage Device, U.S. Pat. No. 5,521,771 to Keithley et al., entitled Servo Gain Compensation In A Disk Drive, U.S. Pat. No. 5,404,255 to Kobayashi et al., entitled Disk Apparatus And Its Control Method, and U.S. Pat. No. 5,585,976 to Pham, entitled Digital Sector Servo Incorporating Repeatable Run Out Tracking.

SUMMARY OF THE INVENTION

An object of the present invention is to provide a reliable method of estimating the gain of a servo control system, which has no relation to the speed measurement noise which may be generated when output information of a servo control system of a disk drive is received.

Another object of the present invention is to provide a method of estimating the gain of a servo control system, which improves the gain estimating performance of a servo control system with regard to the settling time of its power amplifier.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
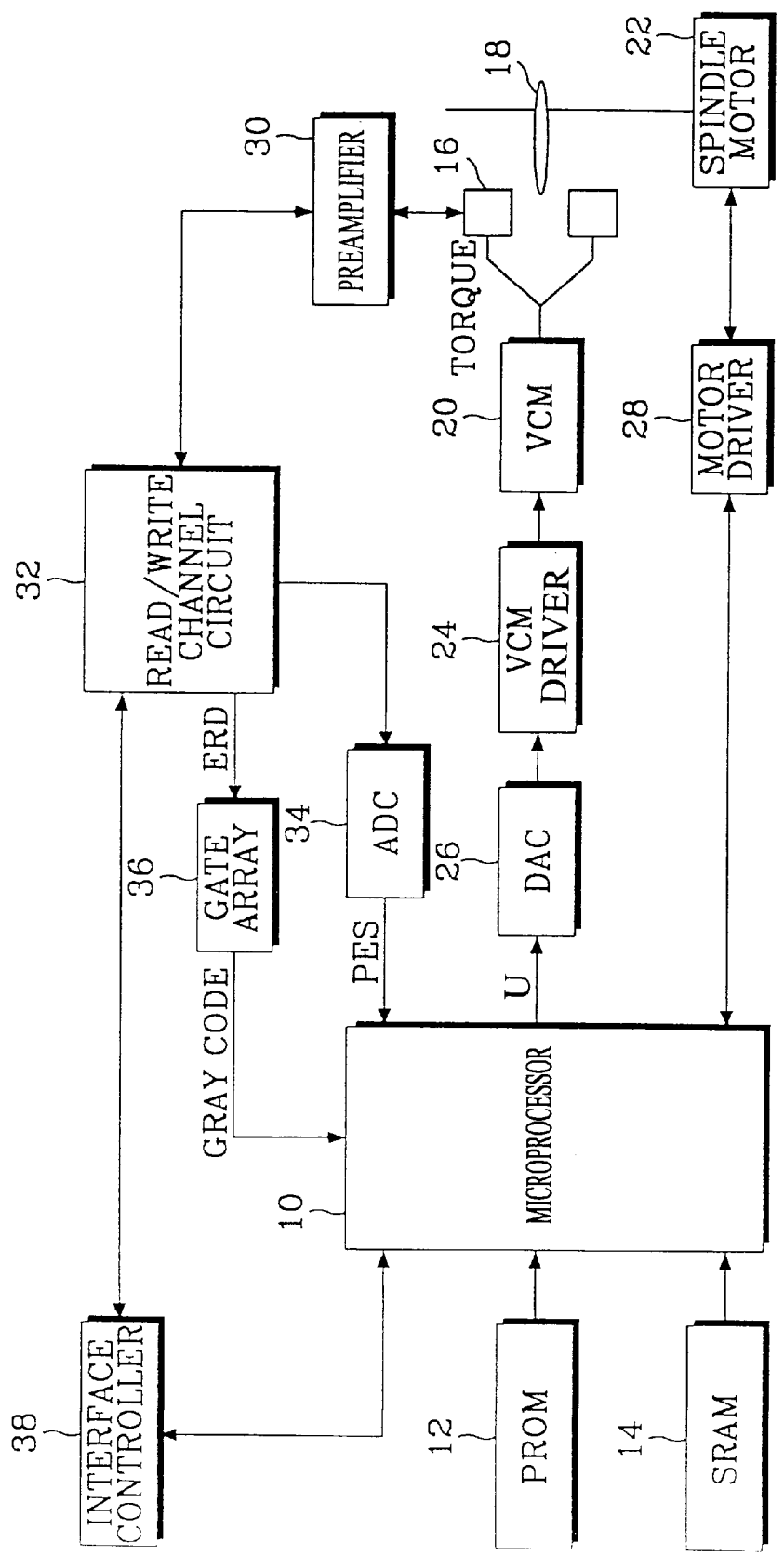
FIG. 1 is a block diagram of a disk drive using a disk recording medium.

FIG. 1 is a block diagram of a disk drive. Referring to FIG. 1, a microprocessor 10 is connected to a programmable read only memory (PROM) 12 for storing a predetermined program and estimate algorithm, and to a static random access memory (SRAM) 14. A head 16 is connected to one end of an actuator, and effects a lateral movement on a disk 18 of a recording medium, and reads and writes data on the disk 18. A voice coil motor (VCM) 20 located on the other end of the actuator is vertically driven on the disk 18 in response to the level and direction of the current supplied thereto. A spindle motor 22 rotates the disk 18 mounted on a driving axis in response to a control signal supplied from a motor driver 28. A VCM driver 24 connected to the VCM 20 controls the VCM 20. A digital-to-analog converter (DAC) 26, which is connected to the microprocessor 10 and the VCM driver 24, receives a digital control input signal U from the microprocessor 10, converts it to an analog signal, and outputs it to the VCM driver 24. The motor driver 28 is connected to the spindle motor 22 and microprocessor 10, and controls spindle motor 22 under the control of microprocessor 10.

A preamplifier 30, connected to the head 16, amplifies a read signal and outputs an input signal to be written by the head 16. A read/write channel circuit 32 is connected to the microprocessor 10, preamplifier 30 and interface controller 38, receives and encodes the written data from the interface controller 38, and outputs it to the preamplifier 30 under the control of the microprocessor 10. Furthermore, the read/write channel circuit 32 digitally-converts an analog read signal input from the preamplifier 30, and outputs it as an encoded read data (ERD). An analog-to-digital converter (ADC) 34 is connected to the read/write channel circuit 32, receives an analog servo read signal, digitally-converts it to a position error signal (PES), and outputs it to the microprocessor 10. A gate array 36 connected to the read/write channel circuit 32 receives the ERD signal and detects servo information such as a gray code in the servo region of the disk 18 from the ERD signal The interface controller 38 performs transmission and reception of data between an external input device (for example, the host computer) and the disk 18.

In the aforementioned disk drive, the ADC 34, DAC 26, VCM driver 24 and VCM 20 form one servo control system. Here, each element of the servo control system has a typical gain characteristic. Accordingly, calibration during the servo control obtained by measuring these characteristics is employed when the drive is initially driven. That is, there are differences of torque Kt and inertia J of the actuators between the disk drive sets, and they can be changed by the surrounding temperature in the track seek mode of the disk drive. Furthermore, the gain KDAC of DAC 26 and gain KADC of ADC 34 may be different between sets and changed by circumstances. Accordingly, a gain constant K0 of the whole servo control system including the torque constant Kt and inertia of the actuator, the gain constant KDAC of DAC 26 and the gain constant KADC of ADC 34 are different between disk drive sets, and can be variously changed according to environmental factors. In order to obtain the control performance of the servo control system which can overcome the environmental factors, the gain of the whole servo control system must be estimated all the time and automatically controlled. Accordingly, it is important to develop an algorithm for estimating the gain of the servo control system.

Figure 2:
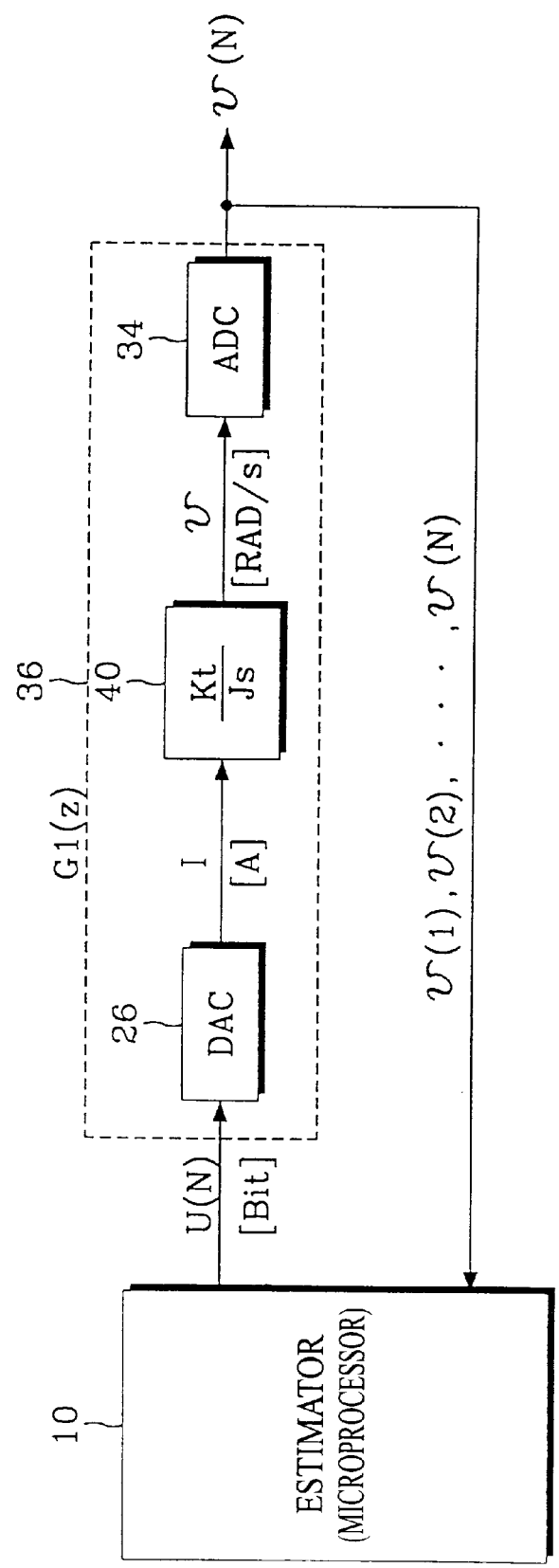
FIG. 2 is a block diagram of an earlier servo control system for the purpose of explaining the gain estimating process of the servo control system.

FIG. 2 is a block diagram of an earlier servo control system for explaining the process of estimating the gain of the servo control system. Referring to FIG. 2, a estimator device is included in the microprocessor in the form of algorithm, and a transfer function G1(Z) of a plant 39 is expressed by the following formula (1).

$$G_1(Z) \cong K_0 \frac{1}{Z-1} = \frac{T_s \cdot K_{DAC} \cdot K_t \cdot K_{ADC}}{J} \frac{1}{Z-1} \quad (1)$$

Here, Kt expresses the torque constant of the VCM 20, J is the inertia of the actuator, $K_{DAC}$ is the gain constant of the DAC 26, $K_{ADC}$ is the gain constant of the ADC 34 and Ts is the sampling time. That is, the microprocessor 10 supplies a DC torque (current I) to actuator 40 to measure the speed V during N sampling, and performs the estimate calculation according to the following formula (2) employing control input data U(N) and output data V(1), V(2), V(3), . . . , V(N) as inputs, to thereby output the gain estimate $K_0$ of the servo control system.

$$\hat{K}_0^* = \frac{V(1)+V(2)+\ldots+V(N-1)+V(N)}{N(N+1)I} \times 2 \qquad (2)$$

Meanwhile, when the track is sought, since the DC torque is supplied during the acceleration section, the gain of the servo control system can be estimated at every track seek. Thus, the control performance which can overcome the environmental variations can be obtained. However, in the servo control system of the earlier disk drive, its speed is measured by differentiating the position data in order to obtain the output information of plant 39. This deteriorates the gain estimating performance of the servo control system if there is speed measurement noise. Furthermore, since the settling time of a power amplifier serving as a current controller is not considered in the earlier servo control system, the gain estimating performance of the servo control system is deteriorated.

Reference will now be made in detail to the preferred embodiment of the present invention, examples of which are illustrated in the accompanying drawings. For clarity, component reference numbers are consistent between all the drawings. There appear many particular details like variables and input/output data with relation to a servo control in the following description. These details are provided just for general understanding of the present invention. It is apparent to a person having common knowledge of this technology that the present invention can be embodied without the particular details. In describing the present invention, a detailed description has been omitted where such a description would obscure the present invention.

Figure 3:
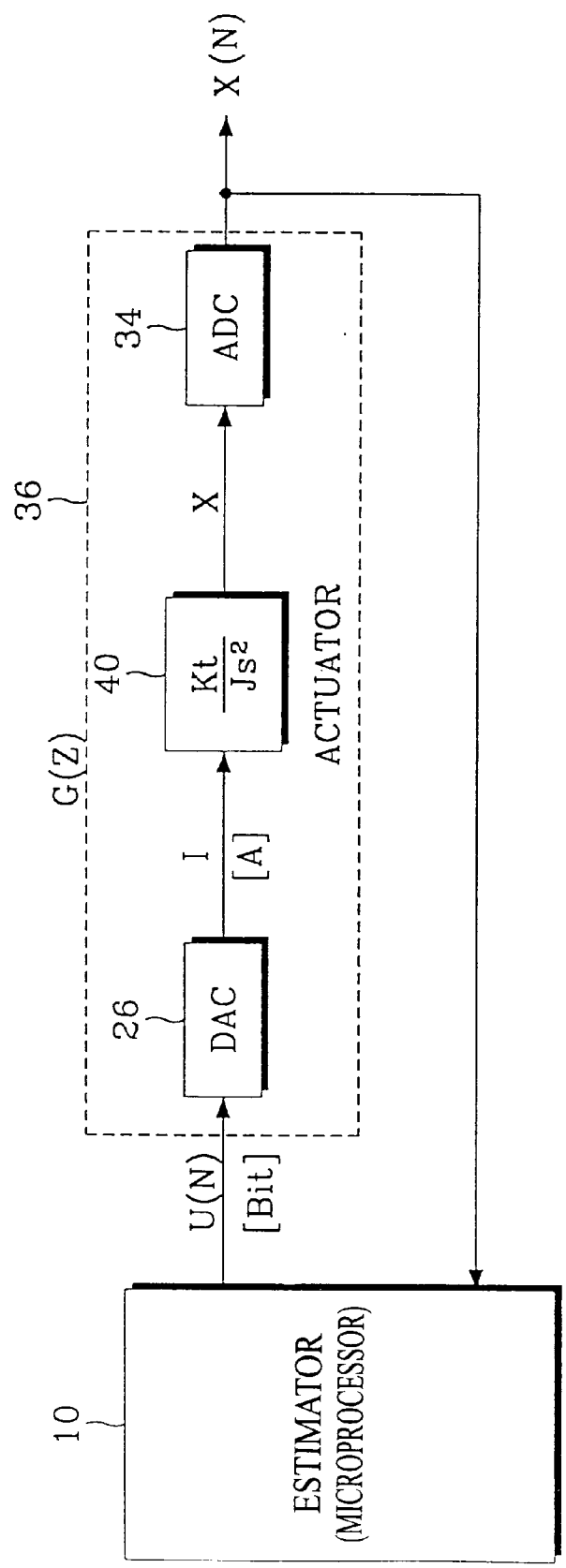
FIG. 3 is a block diagram of a servo control system for the purpose of explaining an automatic gain estimating process of a servo control system according to an embodiment of the present invention.

In an embodiment of the present invention, the gain of the servo control system is estimated by setting a plant model of the servo control system to a secondary plant model $Kt/JS^2$ in order to use the position data of an actuator 40. This will be explained in detail with reference to the accompanying drawing. FIG. 3 is a block diagram of a servo control system for the purpose of explaining an automatic gain estimating process of a servo control system according to the embodiment of the present invention. In FIG. 3, if an analog plant model $Kt/JS^2$ becomes discrete, a transfer function $G(Z)$ of plant 39 will be expressed by the following formula (3).

$$G(Z) \cong \frac{X(Z)}{U(Z)} \cong K_0 Z + \frac{1}{(Z-1)^2} = \qquad (3)$$

$$\frac{1}{2} \frac{T_s^2 K_{DAC} K_t K_{ADC}}{J} Z + \frac{1}{(Z-1)^2}$$

According to the formula (3), the relation ship between input U and output X will be expressed by the following formula (4).

$$X(n+2)-2X(n+1)+X(n)=K_0[U(n+1)+U(n)] \qquad (4)$$

If $X(n)=X^*(n)$ when a specific input $[U(n)=U^*(n)]$ is supplied to plant 39, and then the position information of actuator 40 is measured, the estimate error $K_0$ at each sampling moment will be expressed by the following formula (5).

$$e(1)=X^*(2)-2X^*(1)-\hat{k}_0[U^*(1)+U^*(0)]$$

$$e(2)=X^*(3)-2X^*(2)+X^*(1)-\hat{k}_0[U^*(2)+U^*(1)]$$

$$e(3)=X^*(4)-2X^*(3)+X^*(2)-\hat{k}_0[U^*(3)+U^*(2)]$$

$$e(N)=X^*(N+1)-2X^*(N)+X^*(N-1)-\hat{k}_0[U^*(N)+U^*(N-1)] \qquad (5)$$

Here, the total estimate error will be defined by the following formula (6) by setting a weight $a_1, a_2, \ldots, a_N > 0$ to each estimate error(it is called "reliability").

$$E \tilde{=} a_1[e(1)]^2 + a_2[e(2)]^2 + a_3[e(3)]^2 + \ldots + a_N[e(N)]^2 \qquad (6)$$

Then, total estimate error E becomes a secondary function of $\hat{k}_0$, and $\hat{k}_0$ for minimizing the total estimate error can be obtained from the following formula (7).

$$\hat{K}_0^* = \frac{a_1[U^*(1)+U^*(0)][X^*(2)-2X^*(1)]}{a_1[U^*(1)+U^*(0)]^2 + a_2[U^*(2)+U^*(1)]^2 + \ldots + a_N[U^*(N)+U^*(N-1)]^2} + \qquad (7)$$

$$\frac{a_2[U^*(2)+U^*(1)][X^*(3)-2X^*(2)+X^*(1)]}{a_1[U^*(1)+U^*(0)]^2 + a_2[U^*(2)+U^*(1)]^2 + \ldots + a_N[U^*(N)+U^*(N-1)]^2} +$$

$$\frac{a_N[U^*(N)+U^*(N-1)][X^*(N+1)-2X^*(N)+X^*(N-1)]}{a_1[U^*(1)+U^*(0)]^2 + a_2[U^*(2)+U^*(1)]^2 + \ldots + a_N[U^*(N)+U^*(N-1)]^2}$$

Since control input $U^*(n)=I$ during the acceleration section in the track seek mode, the gain of the servo control system can be estimated using the control input value during the acceleration section. However, a time as long as the settling time of the power amplifier is required to make the actual current value I. Accordingly, if it is assumed that the power amplifier reaches the normal state at the Mth sampling, and the number of effective data sections is N ignoring input/output data during the transient response section (that is, $a_1=a_2=a_3=\ldots=a_N=0$), the gain of the servo control system can be estimated according to the following formula (8).

$$\hat{K}_0^* = \frac{2a_{M+1}X^*(M) + (2a_{M+2}-4a_{M+1})X^*(M+1)}{4I(a_{M+1}+a_{M+2}+\ldots+a_{M+N})} + \qquad (8)$$

$$\frac{(2a_{M+3}-4a_{M+2}+2a_{M+1})X^*(M+2)}{4I(a_{M+1}+a_{M+2}+\ldots+a_{M+N})} +$$

$$\ldots + \frac{2a_{M+N}X^*(M+N+1)}{4I(a_{M+1}+a_{M+2}+\ldots+a_{M+N})}$$

If the weight is fixed (that is, $a_{M+1}=a_{M+2}=\ldots=a_{M+N}=1$), formula (8) is expressed by the following formula (9).

$$\hat{K}_0^* = \frac{X^*(M) - X^*(M+1) - X^*(M+N) + X^*(M+N+1)}{2N} \times \frac{1}{I} \qquad (9)$$

If the weight is increased (that is, $a_{M+N}=n, n=1,2,3,\ldots,N$), formula (8) is expressed by formula (10).

$$\hat{K}_0^* = \frac{X^*(M) - (N+1)X^*(M+N) + NX^*(M+N+1)}{N(N+1)I} \quad (10)$$

That is, in the embodiment of the present invention, the gain of the servo control system can be estimated using position data X*(n) of actuator 40 as described by formula (8). Furthermore, since the gain of the servo control system is estimated using the input/output data of the actuator after the settling time of the power amplifier has passed, the gain estimate error due to the speed measurement noise is reduced, resulting in an accurate estimate of the servo control system gain.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

what is claimed is:

1. A method of estimating the gain of a servo control system, wherein a digital-to-analog converter which converts a digital control signal U into an analog signal, an actuator which is driven according to the analog signal, and an analog-to-digital converter which converts position information X according to the drive of the actuator into digital data form at least one servo control system, said estimation method comprising the steps of:

setting a discrete gain of the actuator, the servo gain system forming a closed loop discrete value system;

obtaining the position information X of the actuator by applying the digital control signal U to the actuator, and calculating an estimate error at each sampling period;

calculating the total estimate error of an entire sampling period by setting a weight to each calculated estimate error; and estimating the gain of the servo control system.

2. The method of estimating the gain of a servo control system as recited in claim 1, wherein input data supplied to the actuator is a current I and data output therefrom is position information X*, and a reliability $(a_{M+1} \sim a_{M+N})$ is established for each of N samples in a data section, and the gain of the servo control system is estimated using the following formula:

$$\hat{K}_0^* = \frac{2a_{M+1}X^*(M) + (2a_{M+2} - 4a_{M+1})X^*(M+1)}{4I(a_{M+1} + a_{M+2} + \ldots + a_{M+N})} +$$
$$\frac{(2a_{M+3} - 4a_{M+2} + 2a_{M+1})X^*(M+2)}{4I(a_{M+1} + a_{M+2} + \ldots + a_{M+N})} +$$
$$\ldots + \frac{2a_{M+N}X^*(M+N+1)}{4I(a_{M+1} + a_{M+2} + \ldots + a_{M+N})}.$$

3. The method of estimating the gain of a servo control system as recited in claim 2, the gain of the servo control system being estimated by the following formula when $a_{M+1} = a_{M+2} = \ldots = a_{M+N} = 1$:

$$\hat{K}_0^* = \frac{X^*(M) - X^*(M+1) - X^*(M+N) + X^*(M+N+1)}{2N} \times \frac{1}{I}.$$

4. The method of estimating the gain of a servo control system as recited in claim 2, the gain of the servo control system being estimated by the following formula when aM+N=n and n=1, 2, 3, ..., N:

$$\hat{K}_0^* = \frac{X^*(M) - (N+1)X^*(M+N) + NX^*(M+N+1)}{N(N+1)I}.$$

5. A method of estimating the gain of a servo control system, comprising:

converting a digital control signal U into an analog signal;

driving an actuator in dependence upon the analog signal;

converting position information X corresponding to movement of the actuator attributable to said driving into digital data for at least one servo control system forming a closed loop discrete value system by:

setting a discrete gain for the actuator;

obtaining said position information X for the actuator by applying said digital control signal U to the actuator and making an estimate of error at each sampling period;

determining a total for said estimate of error corresponding to an entire sampling period by setting a weight to each said estimate of error; and estimating gain of the servo control system.

6. A servo control system comprising:

a digital-to-analog converter for converting a digital control signal U into an analog signal;

an actuator driven by the analog signal;

an analog-to-digital converter for converting position information X according to the drive of the actuator into digital data;

a gain setter for setting a discrete gain of the actuator, the servo gain system forming a closed loop discrete value system;

a first calculator for obtaining the position information X of the actuator by applying the digital control signal U to the actuator, and calculating an estimate error at each sampling period;

a second calculator for calculating the total estimate error of an entire sampling period by setting a weight to each calculated estimate error; and a gain estimator for estimating the gain of the servo control system.

7. The servo control system as recited in claim 6, wherein input data supplied to the actuator is a current I and data output therefrom is position information X*, and a reliability $(a_{M+1} \sim a_{M+N})$ is established for each of N samples in a data section, and the gain of the servo control system is estimated by the gain estimator for estimating the gain of the servo system using the following formula:

$$\hat{K}_0^* = \frac{2a_{M+1}X^*(M) + (2a_{M+2} - 4a_{M+1})X^*(M+1)}{4I(a_{M+1} + a_{M+2} + \ldots + a_{M+N})} +$$
$$\frac{(2a_{M+3} - 4a_{M+2} + 2a_{M+1})X^*(M+2)}{4I(a_{M+1} + a_{M+2} + \ldots + a_{M+N})} +$$
$$\ldots + \frac{2a_{M+N}X^*(M+N+1)}{4I(a_{M+1} + a_{M+2} + \ldots + a_{M+N})}.$$

8. The servo control system as recited in claim 7, the gain of the servo control system being estimated by the gain estimator for estimating the gain of the servo system using the following formula when $a_{M+1} = a_{M+2} = \ldots = a_{M+N} = 1$:

$$\hat{K}_0^* = \frac{X^*(M) - X^*(M+1) - X^*(M+N) + X^*(M+N+1)}{2N} \times \frac{1}{I}.$$

9. The servo control system as recited in claim 7, the gain of the servo control system being estimated by the gain estimator for estimating the gain of the servo system using the following formula when aM+N=n and n=1, 2, 3, ..., N:

$$\hat{K}_0^* = \frac{X^*(M) - (N+1)X^*(M+N) + NX^*(M+N+1)}{N(N+1)I}.$$

10. An apparatus for estimating the gain of a servo control system, comprising:

a converter converting a digital control signal U into an analog signal;

a driver driving an actuator in dependence upon the analog signal output from said converter;

another converter for converting position information X corresponding to movement of th actuator attributable to said driving into digital data for at least one servo control system forming a closed loop discrete value system, said another converter comprising:

a setter for setting a discrete gain for the actuator;

a first calculator for obtaining said position information X for the actuator by applying said digital control signal U to the actuator and making an estimate of error at each sampling period;

a second calculator for determining a total for said estimate of error corresponding to an entire sampling period by setting a weight to each said estimate of error; and a gain estimator for estimating gain of the servo control system.

* * * * *